Oct. 25, 1949.                     R. BEDELL                    2,485,804
                          BRAKE HEAD RETAINER AND BEAM
                              Filed Sept. 28, 1946

INVENTOR:
*Rodney Bedell*

Patented Oct. 25, 1949

2,485,804

UNITED STATES PATENT OFFICE 2,485,804

BRAKEHEAD RETAINER AND BEAM

Rodney Bedell, Webster Groves, Mo., assignor to Chicago Railway Equipment Company, Chicago, Ill., a corporation of Illinois Application September 28, 1946, Serial No. 700,061

8 Claims. (Cl. 188—224.1)

1

The invention relates to railway brake beams of the truss-type and consists in structure for maintaining the assembly of the compression member, the tension member and the brake head.

In a usual truss-type brake beam, the head is seated on the end of the compression member and has a bearing on its outer face for a nut threaded on the end of the tension rod which passes through the brake head diagonally of the compression member. If the nut works off or if the tension rod fails, the head may become disassembled from the compression and tension members. In such event, if the only support for the beam is the usual swing hanger received in the head, the beam may fall to the track and may cause serious damage to the truck and even wreck the train.

The main object of the invention is to maintain assembly of the beam in the event the tension rod or the nut fails.

Another object is to provide a safety retainer for the head and other beam members which is simple, inexpensive and effective for the purpose indicated.

It is a further object to attain this result without weakening the beam compression member, tension member or brake head.

Another object is to apply a retainer to a previously completed beam without disassembling its parts.

These and other detail objects are attained by the structure illustrated in the accompanying drawing, in which.

Figure 1:
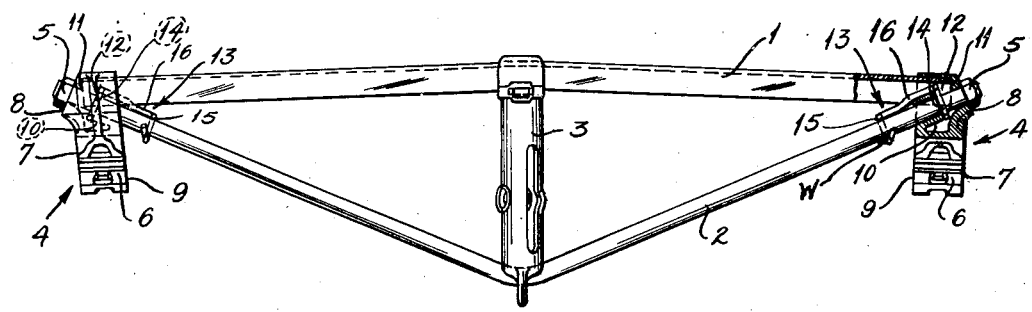
Figure 1 is a top view of a railway truss-type brake beam embodying one form of the invention, the right hand end being sectioned.
Figure 2:
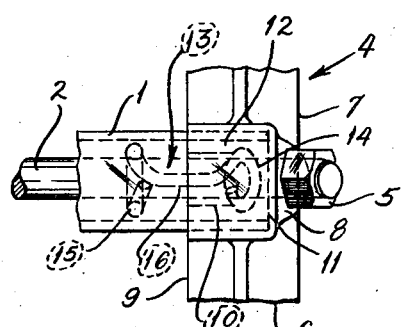
Figure 2 is a rear view of the left hand end of Figure 1 and drawn to an enlarged scale.

The beam illustrated in Figures 1 and 2 includes a channel-shaped compression member 1, a round rod tension member 2, a strut 3 intermediate the ends of the beam, brake heads 4 mounted on the converging ends of the compression and tension members, and tensioning nuts 5 threaded on the ends of the tension member. Each head 4 includes the usual elements

2

6 facing forwardly of the beam to support the usual brake shoe (not shown). The outer side 7 of the head has a bearing 8 for nut 5. The inner side 9 of the head preferably includes a sleeve 10 which encircles tension rod 2 and restrains tension rod 2 against play relative to compression member 1. The head is recessed inwardly at 12 from its inner side 9 to receive the end portion of compression member 1 and the end of the latter is seated at 11. All of the above-described features correspond to well-known structure.

A retainer 13, adapted to prevent accidental disassembly of brake head 4 from tension rod 2 and compression member 1, is made of a piece of wire with hook-like terminals which may be formed by bending its ends into loops 14 and 15 arranged to receive tension rod 2. Loops 14 and 15 are aligned axially with one another and extend outwardly of and at the same side of a connecting portion 16. The planes of the loops are substantially perpendicular to connecting portion 16 which is positioned longitudinally of and substantially parallel to tension rod 2. Loop 15 is welded or otherwise secured to tension rod 2 between the head and the strut. Loop 14 is positioned within recess 12 of brake head 4 and opposes the adjacent end of sleeve 10 to restrain outward movement of the brake head relative to compression member 1 and tension rod 2 if nut 5 or the end portion of tension rod 2 fails.

Figure 3:
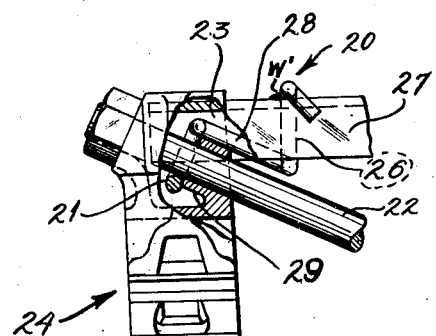
Figure 3 is a top view corresponding to the left hand end of Figure 1, drawn to an enlarged scale and with the brake head partially sectioned vertically, and showing another form of the invention.
Figure 4:
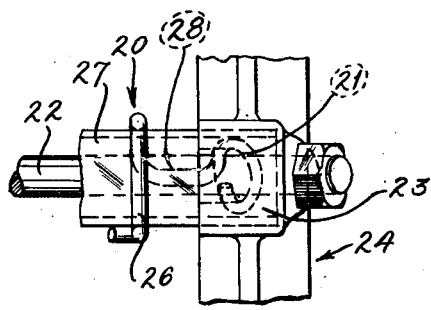
Figure 4 is a rear view thereof.

In Figures 3 and 4, the retainer 20 comprises a wire bent at one end into a hook-like loop 21 receiving tension rod 22 and within recess 23 of brake head 24 for opposing the adjacent end of sleeve 29 of brake head 24. The opposite end of retainer 20 is bent into a loop 26 receiving compression member 27 and outside of recess 23 and is welded or otherwise secured to compression member 27. Loops 21 and 26 extend outwardly of and at opposite sides of a connecting portion 28 and the planes of the loops are substantially perpendicular to connecting portion 28 which is positioned longitudinally of and substantially parallel to tension rod 22 adjacent compression member 27.

Figure 5:
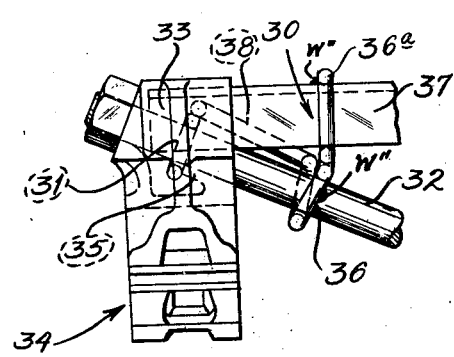
Figures 5 and 6 are views similar to Figures 3 and 4, respectively, and show another form of the invention.
Figure 6:
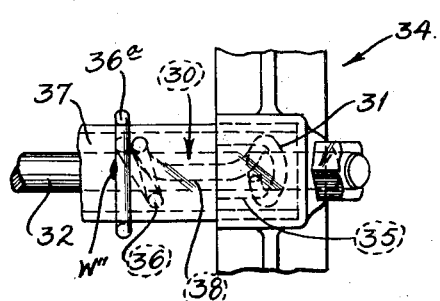

In the embodiment shown in Figures 5 and 6, retainer 30 is formed of a wire bent at one end into a hook-like loop 31 receiving tension rod 32 and in recess 33 of brake head 34 for opposing the adjacent end of sleeve 35. The opposite end is bent into a loop 36 receiving tension rod 32 and outside of recess 33 and then is bent into a second loop 36a to receive member 37 and in a direction opposite to loop 36. Loops 31 and 36 are substantially aligned axially and extend outwardly of and at the same side of a connecting portion 38. Loop 36a extends outwardly of connecting portion 38 at the side opposite to loops 31 and 36. The planes of loops 31 and 36 are substantially perpendicular to connecting portion 38 which is positioned longitudinally of and substantially parallel to tension rod 32 adjacent member 37. Loops 36 and 36a are welded or otherwise secured to tension rod 32 and member 37, respectively.

The retainers 13, 20 and 30 can be formed complete as described above and installed as the brake beam parts are assembled by inserting loop 14, 21 or 31 in the brake head and inserting the compression member into loop 26 or 36a of retainer 20 or 30 and into the brake head recess, and then inserting the rod through loop 15 or 36 of retainer 13 or 30 and through the head sleeve opening and retainer loop 14, 21 or 31. Loops 15, 26 or 36 and 36a then are welded to the beam.

The retainer may be applied to a previously assembled beam by forming open loops on the ends and inserting one end into the head recess and behind the inner end of the sleeve and then bending the other end around the tension member, compression member, or both, and securing the end of the wire by welding. So long as a hooklike terminal opposes the inner end of the sleeve and is held against removal from the head, the device will function as intended.

The retainers preferably are resilient to accommodate relative movement of the beam parts so that the welded loops of the retainers do not break loose from the brake beam during such movement.

It will be understood that the safety retainers here illustrated are not intended to take the place of the tensioning nuts for resisting the thrusts exerted longitudinally of the beam when the brakes are applied and released, but they will prevent the head from accidentally being disassembled from the remaining beam parts and the resultant dropping of the parts to the rail.

A safety retainer of the kind described may be applied to a truss-type brake beam without drilling or slotting, as has been necessary for retainers previously suggested for similar purposes.

Details of the construction may be varied substantially without departing from the spirit of the invention and the exclusive use of novel structure coming within the scope of the claims is contemplated.

What is claimed is:

1. In a railway truss-type brake beam including a compression member and a tension member, a brake head mounted on said members, and an elongated element with an end extending around at least one of said members and with the other end hooked into the brake head to prevent accidental removal of said brake head from said members.

2. In a railway truss-type brake beam including a compression member, a tension member, and a brake head having a recess receiving the ends of said members, an element with one end inserted in said recessed portion and opposing a brake head part facing towards the end of the beam, said element extending from the brake head inwardly of the beam and extending around and secured to one of said members to prevent accidental removal of said brake head from said compression member.

3. In a railway truss-type brake beam including a compression member, a tension member, and a brake head having a recessed portion receiving the ends of said members, an element having one end extending around and welded to at least one of said members and having the opposite end encircling the tension member within said brake head recessed portion and opposing a brake head element in said recessed portion to prevent accidental removal of said brake head from said compression member.

4. In a railway truss-type brake beam including a compression member, a tension member, and a brake head receiving the ends of said members and including a tensioning device seat at one side and a sleeve extending inwardly from its opposite side to receive the tensioning member, an element having one end extending around the tension member within the brake head adjacent the inner end of its sleeve and having the opposite end attached securely to at least one of said members inwardly of the beam from the head to prevent accidental removal of said brake head from said compression member.

5. In a railway truss-type brake beam including a compression member, a tension member, and a brake head receiving the ends of said members, an element having its ends extending around the tension member, one end of said element being positioned within a recess in said brake head and opposing said head and the other end of said element being positioned outside of said brake head.

6. In a railway truss-type brake beam including a compression member, a tension member, and a brake head receiving the ends of said members, an element having one end extending around the compression member and having the opposite end extending around the tension member and opposing said head to prevent accidental removal of said brake head from said members.

7. In a railway truss-type brake beam including a compression member, a tension member, and a brake head receiving the ends of said members, an element having one end extending around both of said members and having the other end bent around the tension member and opposing said head to prevent accidental removal of said brake head from said compression member.

8. A retainer for a brake beam comprising an elongated device shaped at one end into a single loop and at the opposite end into a double loop and including an elongated connecting portion between the single and double loops, the single loop extending outwardly and to one side of the connecting portion, and the double loop extending outwardly at opposite sides of the connecting portion, one of the double loops being substantially aligned axially with the single loop at the other end of the connecting portion.

RODNEY BEDELL.

REFERENCES CITED

The following references are of record in the file of this patent:

UNITED STATES PATENTS

| Number | Name | Date |
|---|---|---|
| 1,647,884 | Penwarden | Nov. 1, 1927 |
| 1,724,265 | Ekholm | Aug. 13, 1929 |
| 1,900,224 | Busse | Mar. 7, 1933 |
| 2,047,455 | Anderson | July 14, 1936 |
| 2,319,440 | Busse | May 18, 1943 |
| 2,391,329 | Moline | Dec. 18, 1945 |